United States Patent
Liu

(10) Patent No.: US 7,395,060 B2
(45) Date of Patent: Jul. 1, 2008

(54) SIGNAL TESTING SYSTEM

(75) Inventor: I-Ru Liu, Taipei (TW)

(73) Assignee: Arcadyan Technology Corporation, Hsinchu (TW)

( * ) Notice: Subject to any disclaimer, the term of this patent is extended or adjusted under 35 U.S.C. 154(b) by 443 days.

(21) Appl. No.: 11/245,207

(22) Filed: Oct. 7, 2005

(65) Prior Publication Data
US 2006/0252419 A1 Nov. 9, 2006

(30) Foreign Application Priority Data
May 3, 2005 (TW) .............................. 94114181 A

(51) Int. Cl.
*H04Q 7/20* (2006.01)
(52) U.S. Cl. .................. 455/423; 455/424; 455/425; 455/67.11; 455/67.14
(58) Field of Classification Search ............... 455/423, 455/424, 425, 67.11, 67.14
See application file for complete search history.

(56) References Cited

U.S. PATENT DOCUMENTS 5,487,069 A 1/1996 O'Sullivan ................ 370/94.3
6,741,640 B1 * 5/2004 Johnson ..................... 375/219
7,155,216 B2 * 12/2006 Kiukkonen et al. ......... 455/423

* cited by examiner

*Primary Examiner*—Joseph Feild
*Assistant Examiner*—S. Smith
(74) *Attorney, Agent, or Firm*—Troxell Law Office, PLLC

(57) ABSTRACT

A signal testing system is disclosed, which is capable of achieving a bi-directional wireless transmission measurement enabling mutual testing between device-under-tests and reference devices by configuring a symmetrical structure with circulators and multiplexers. Moreover, the signal testing system not only is capable of fetching signal out of a test path by the use of power dividers and then transmitting the fetched signal to a signal analyzer to be analyzed so as to enable the system to support multiple testing, but also is capable of generating a signal used for referencing by a signal synthesizer so as to enable the system to support numerous tests. In addition, both the signal analyzer and the signal synthesizer have a switch control integrated therein, which enables the signal analyzer to perform analysis on signals of different frequency bandwidth, and enables the signal synthesizer to generate signals of different frequency bandwidth as require.

25 Claims, 4 Drawing Sheets

SIGNAL TESTING SYSTEM

FIELD OF THE INVENTION

The present invention relates to a signal testing system, and more particularly, to a signal testing system having an integrated, self-contained, flexible and automatic architecture for fitting itself in the manners (a) of making devices be under test or be of reference; (b) for testing in batch or in individual; (c) for testing in parallel or in sequential; (d) which supporting numerous tests; and (e) which supporting complicated test items.

BACKGROUND OF THE INVENTION

With rapid advance of wireless technology, wireless electronic devices are becoming essentials for our daily life. Among those, equipment enabling wireless connection like wireless networking card, base station, and so on, had facilitated our life ever further. In the process of manufacturing that wireless equipment, it is important to cooperate proper test measurements into the process since the production cost and quality might depend on a well-designed signal testing system performing those test measurements.

Most conventional signal testing systems comprise only a signal analyzer and a signal synthesizer, which can be very expensive and hard to be configured to perform test measurements, such as test in batch, interference immunity test, intermodulation distortion test, spur inhibition test, harmonics suppression test, multiple-station test, and performance test under dense electromagnetic, etc. Moreover, the conventional signal analyzer, which adopts a technique of scanned superheterodyne receiving, can only support non-simultaneous, low probability of intercept, and slow speed applications, while the conventional signal synthesizer, which adopts a technique of swept generation, can only support non-simultaneous, high density signal simulation, and slow speed applications. Therefore, it is intended in this invention to provide an improved signal testing system having signal controlling devices connecting to a signal analyzer and a signal synthesizer in respective, such that the signal testing system is able to process signals as well as generate signals in parallel.

SUMMARY OF THE INVENTION

In view of the disadvantages of prior art, the primary object of the present invention is to provide a signal testing system capable of providing a two-way, multi-channel environment for testing wireless products.

To achieve the above object, the present invention provides a signal testing system, capable of testing at least a device-under-test (DUT) while selectively connecting the signal testing system to at least a reference device externally, the system comprising:
  a first circulator, being connected to the reference device for receiving a reference signal transmitting therefrom;
  a second circulator, being connected to the device-under-test for receiving a testing signal transmitting therefrom;
  a first channel emulator, receiving a signal transmitted from the first circulator for simulating a first wireless transmission environment;
  a first power divider, receiving a signal transmitted from the first channel emulator for performing an operation of power assignment thereon while transmitting the divided signal to the second circulator;
  a second channel emulator, receiving a signal transmitted from the second circulator for simulating a second wireless transmission environment;
  a second power divider, receiving a signal transmitted from the second channel emulator for performing an operation of power assignment thereon while transmitting the divided signal to the first circulator;
  a first duplexer, for receiving signals transmitted from the first power divider and the second power divider in respective; and
  a signal analyzer, receiving and analyzing signals transmitted from the first duplexer;
  wherein, the first circulator generates a signal to be received by the reference device while receiving the divided signal transmitted from the second power divider; and the second circulator generates a signal to be received by the device-under-test while receiving the divided signal transmitted from the first power divider.

In a preferred embodiment of the invention, the signal testing system is connected externally to a plurality of reference devices while the system further comprise:
  a first multiplexer, selectively receiving signals transmitted from the plural reference devices while combining the received signals to generated a signal to be received by the first circulator; and
  a second multiplexer, selectively receiving signals transmitted from the plural device-under-tests while combining the received signals to generated a signal to be received by the second circulator;
  wherein, the first multiplexer separate a signal transmitted from the first circulator so as to generates signals to be received by the plural reference devices; and the second multiplexer separate a signal transmitted from the second circulator so as to generates signals to be received by the plural device-under-tests.

In another preferred embodiment of the invention, the signal analyzer further comprises: an amplifier, connected to the first duplexer for amplifying the signals transmitted therefrom; a signal receiver, connected to the amplifier, capable of power dividing, filtering and converting the signals outputted from the amplifier; a switch control, connected to the signal receiver, capable of power dividing the signals transmitted from the signal receiver while selectively switching on/off the conducting of the divided signals so as to generate a plurality of combined signals, each being formed by selectively combining at least a divided signal selected from the group of the conducting signals; and a signal processor, for receiving and analyzing the plural combined signals.

Moreover, in a preferred embodiment of the invention, the signal testing system further comprises: a signal synthesizer, for generating a pulse signal; and a second duplexer, connected to the signal synthesizer, for enabling a situation selected from one of the following: transmitting the pulse signal to the first multiplexer for using the same as the signal outputted from the reference device, and transmitting the pulse signal to the second multiplexer for using the same as the signal outputted from the device-under-test. Wherein, the signal synthesizer further comprises: a signal generator; a switch control, connected to the signal generator for receiving a plurality of signals outputted from the same, capable of power-dividing the plural signals transmitted from the signal generator while selectively switching on/off the conducting of the divided signals so as to generate a plurality of combined signals, each being formed by selectively combining at least a divided signal selected from the group of the conducting signals; a signal transmitter, for receiving the signals outputted from the switch control so as to perform operations of filtering, converting and power-combining on the received signals; and an amplifier, for receiving and amplifying a signal outputted from the signal transmitter so as to generate the pulse signal.

The referring signal control further comprises: a plurality of power dividers, each being enabled to received a corresponding signal outputted from the signal receiver in a one-to-one manner for performing an operation of power assignment on the same; a plurality of switch units, each being connected to a number of corresponding power dividers out of the plural power dividers for receiving signals outputted from the corresponding power dividers while selectively switching on/off the conducting of the received signals with respect to a control signal; and a plurality of power combiner, each being connected to a corresponding switch unit out of the plurality switch units in a one-to-one manner for generating a combined signal by combining the received signals controlled to be conducted.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
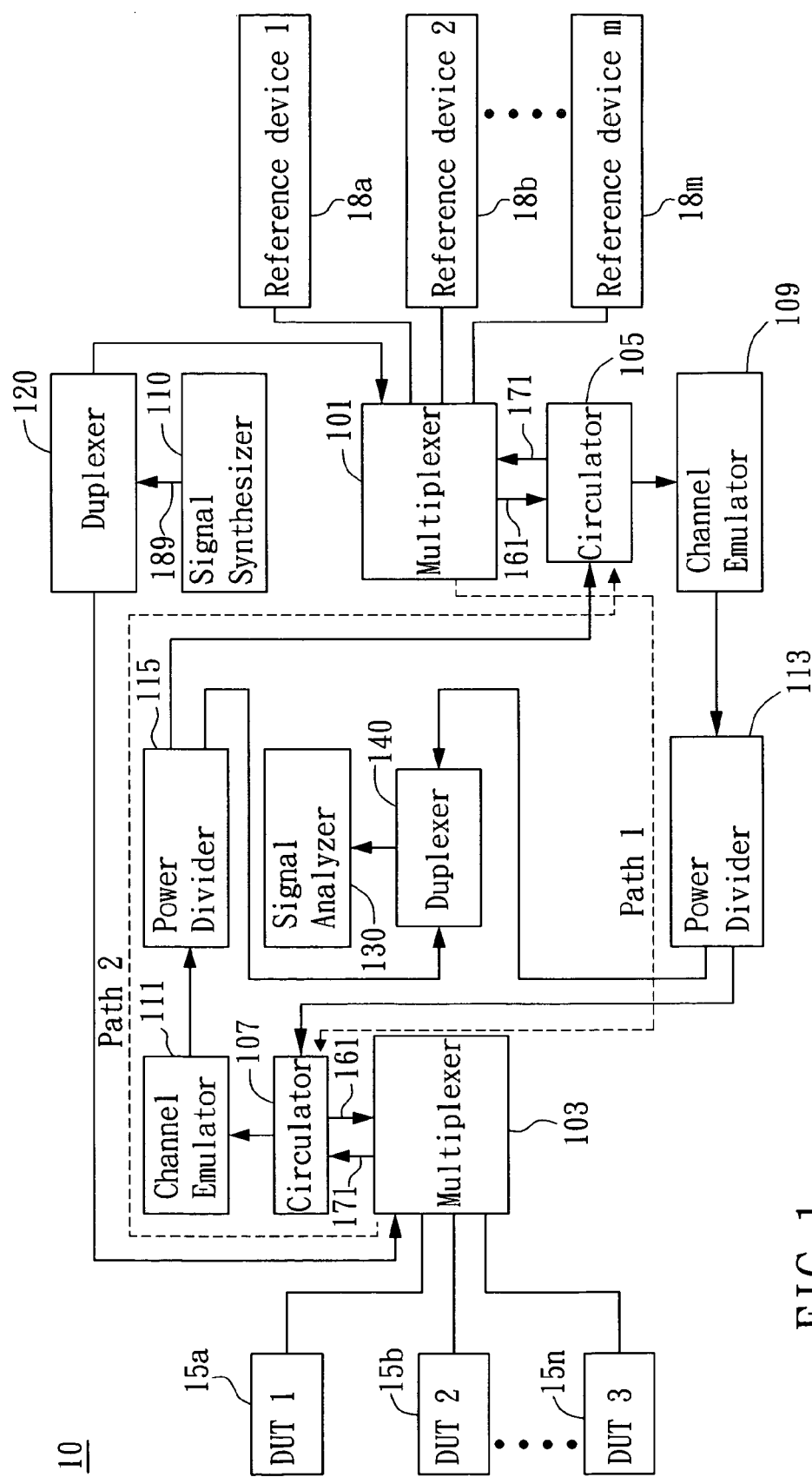
FIG. 1 is a schematic diagram depicting a signal testing system of the invention.

Please refer to FIG. 1, which is a schematic diagram depicting a signal testing system of the invention. The signal testing system 10 comprises two multiplexers 101, 103, two circulators 105, 107, two channel emulators 109, 111, two power dividers 113, 115, a signal analyzer 130, and a signal synthesizer 110. While using a plurality of reference devices 18a~18m as transmitters (Tx), the signal test system 10 can provide a simulated wireless transmission path, i.e. the dotted arrow of path 1 shown in FIG. 1, enabling the signals outputted from the transmitters to be transmitted sequentially through the multiplexer 101, the circulator 105, the channel emulator 109, the power divider 113, the circulator 107, the multiplexer 103 and finally to the receivers (Rx), which are a plurality of device-under-tests (DUTs) 15a~15n.

In addition, while using the plural DUTs 15a~15n as transmitters (Tx), the signal test system 10 can provide another simulated wireless transmission path, i.e. the dotted arrow of path 2 shown in FIG. 1, enabling the signals outputted from the transmitters to be transmitted sequentially through the multiplexer 103, the circulator 107, the channel emulator 111, the power divider 115, the circulator 105, the multiplexer 101 and finally to the receivers (Rx), which are the plural reference devices 18a~18m.

When the plural reference devices 18a~18m are employed as transmitters, each of the plural reference devices 18a~18m will issue a signal to the multiplexer 101 where the plural signals are combined into a reference signal 161 to be outputted by the multiplexer 101, where the reference signal is substantially a multiplexed signal formed by combining the plural signal inputting to the multiplexer 101. However, in a condition that there is only a single reference device 18a used as the transmitter of the testing system, the signal outputted from the single reference device 18a can be transmitted directly to the next device of path 1 without having to pass through the multiplexer 101. As the reference signal 161 is being transmitted following the path 1 to flow clockwisely through the circulator 105 into the channel emulator 109, the channel emulator 109 can provide a simulated wireless transmission environment for reference signal 161, that is, the passing of the reference signal 161 through the channel emulator 109 is similar to that the reference signal 161 is being transmitted wirelessly. Generally, the channel emulator 109 is consisted of a transmission line, an attenuator, a delay line, an equalizer, a filter, a limiter, and channel simulator.

As the reference signal 161 went pass the channel emulator 109, it is being transmitted to the power divider 113 for power-dividing and then the divided reference signals are further being transmitted to the circulator 107 and a duplexer 140, where the circulator 107 will transmit the received divided reference signal following a clockwise direction to the multiplexer 103 for demultiplexing and then outputting the demultiplexed reference signals respectively to the plural DUTs 15a~15n, while the duplexer 140 will send the received divided reference signal to the signal analyzer 130 for analyzing.

That is, the reference signal 161 formed by the combination of the signals outputted from the plural reference devices 18a~18m is transmitted in a simulated wireless environment by way of the path 1 and then to be received by the DUTs 15a~15n such that the receiving performances of the DUTs 15a~15n can be measured, and at the same time that the reference signal 161 is being send to the signal analyzer 130 by way of the power divider 113 following the path 1, where the reference signal is being analyzed. Therefore, by comparing the result of signal analysis performed by the signal analyzer 130 and the measurement of the receiving performances of the DUTs 15a~15n, the capabilities of the DUTs 15a~15n for receiving the reference signal 161 can be tested and measured.

Similarly, when the plural DUTs 15a~15n are employed as transmitters, the reference signal 171 formed by the combination of the signals outputted from the plural DUTs 15a~15n is transmitted in a simulated wireless environment by way of the path 2 and then to be received by the plural reference devices 18a~18m such that the transmitting performances of the DUTs 15a~15n can be measured, and at the same time that the reference signal 171 is being sent to the signal analyzer 130 by way of the power divider 115 following the path 2, where the reference signal is being analyzed. Therefore, by comparing the result of signal analysis performed by the signal analyzer 130 and the measurement of the transmitting performances of the DUTs 15a~15n, the transmission capabilities of the DUTs 15a~15n can be tested and measured.

In addition, the reference signal 161 not only can be the combination of the signals outputted from the plural reference devices 18a~18m, it can be a signal generated by a signal synthesizer 110. Similarly, the reference signal 171 is the same. That is, if a pulse signal 189 generated by the signal synthesizer 110 is diverted by the duplexer 120 to the multiplexer 101, the pulse signal 189 is used as the reference signal 161, however, if the pulse signal 189 generated by the signal synthesizer 110 is diverted by the duplexer 120 to the multiplexer 103, the pulse signal 189 is used as the reference signal 171.

Not only the pulse signal 189 can act as the replacement of the signals outputted from the plural reference devices 18a~18m, it can also act as an external interference signal in addition to the reference signal 161 for further enhancing the reality of the simulated wireless transmission environment. Similarly, the pulse signal 189 not only can act as the replacement of the signals outputted from the plural DUTs 15a~15n, it can also act as an external interference signal in addition to the reference signal 171 for further enhancing the reality of the simulated wireless transmission environment. In addition, the pulse signal 189 can also be used for calibrating the plural reference devices 18a~18m as well as the plural DUTs 15a~15n.

Figure 2:
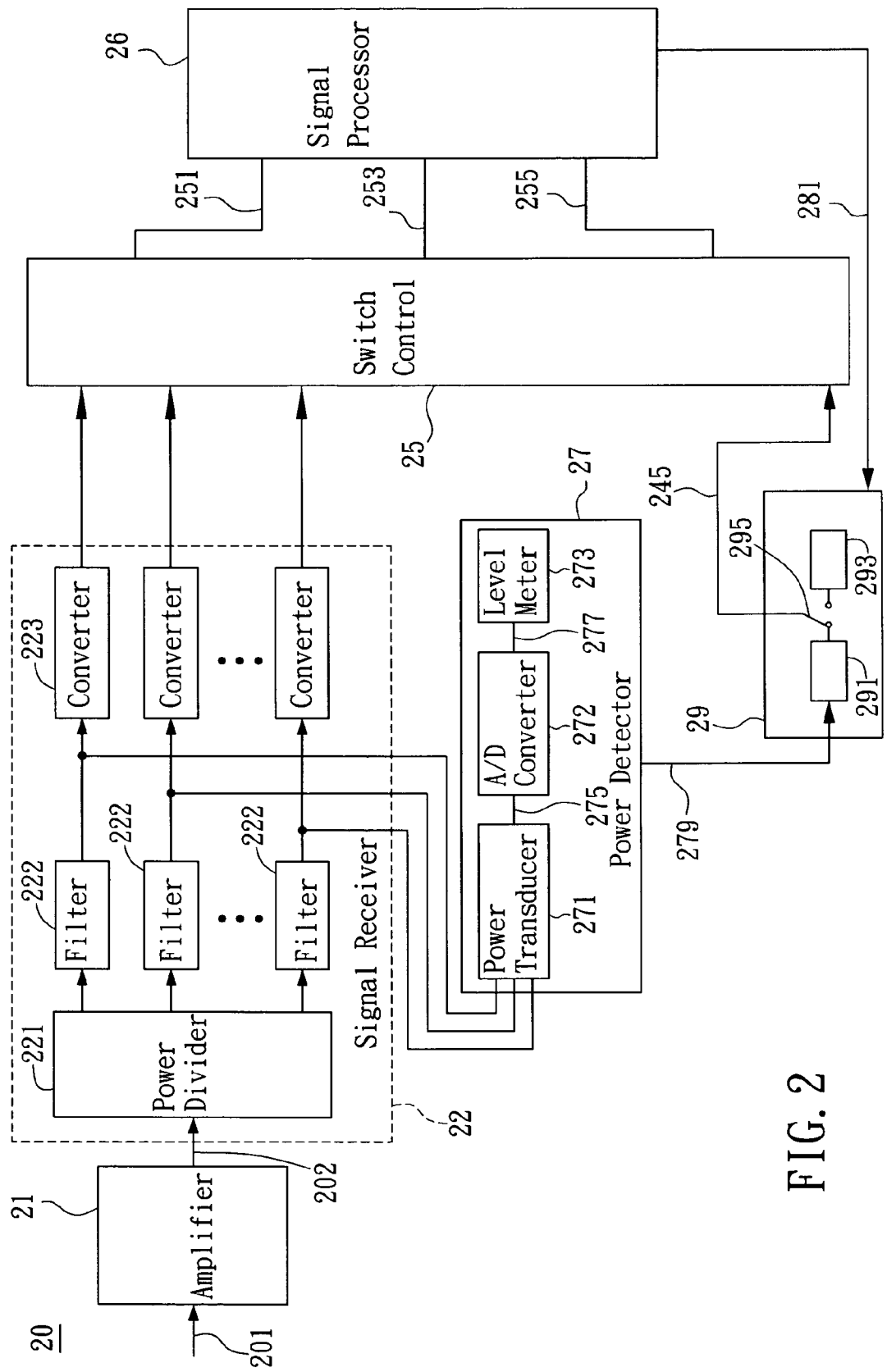
FIG. 2 is a schematic diagram depicting a signal analyzer of the invention.

Please refer to FIG. 2, which is a schematic diagram depicting a signal analyzer according to a preferred embodiment of the invention. The signal analyzer 20 of the invention is used for analyzing high frequency signals of a wireless network. In the preferred embodiment, the amount of channels available in the wireless network is eleven, however, the amount of channels are not restricted by that. The signal analyzer 20 of the invention comprises an amplifier 21, a signal receiver 22, a switch control 25, a signal processor 26 and a power detector 27. The amplifier 21 is used for receiving and amplifying a reference signal 201 so as to output an amplified reference signal 202 to a posterior circuit, which is substantially a low noise amplifier. The signal receiver 22 includes a power divider 221, a plurality of filters 222 and a plurality of converters 223, wherein the amplified reference signal 202 is received by the power divider 221 for power-dividing and then the divided reference signals are respectively being transmitted to a corresponding filter 222 for filtering.

In the preferred embodiment, the coverage of the overlapped or non-overlapped frequency in the wireless network is assumed to be 100 MHz with 5 MHz resolution, so that the amount of Tx can be twenty, i.e. 100÷5=20, and thus there are 20 reference signals. Therefore, there are twenty filters 222 and twenty converters 223 required in the preferred embodiment. Preferably, the filters 222 are band-pass filters, each with different contiguous passband that is selected with respect to the effective spectrum of each channel. For example, the second to the fifth filters 222 can allow most energy of the first channel of the wireless network to pass while the third to the sixth filters 222 can allow most energy of the second channel of the wireless network to pass, and so on, such that strength histogram relative to the number of the channels can be made enabling the reference signals of different channels to be clustered and distinguished. In this preferred embodiment, there are three reference signals 201 for the sake of simplicity, and correspondingly there are three filters 222 and three converters 223 required for processing the reference signals 201. Each converter 223 is used for down-converting the filtered reference signal outputted from a corresponding filter 222 into an intermediate frequency (IF) signal to be received by the switch control 25.

Thereafter, the switch control 25 proceeds to perform the operation of power-dividing the down-converted reference signals 201 transmitted from the plural converters 223 of the signal receiver 22 while selectively switching on/off the conducting of the divided signals so as to generate a plurality of combined signals 251~253, each being formed by selectively combining at least a divided signal selected from the group of the conducting signals. For instance, the operation performed by the switch control 25 is performed based on the number of channels required for a specific test, band width, frequency overlapping magnitude and frequency resolution, or according to the frequency band capable of being analyzed by the signal processor 26.

By virtue of the aforesaid, the switch control 25 is controlled by a control signal 245, that is, as the operation of power-dividing the down-converted reference signals 201 transmitted from the signal receiver 22 is being performed, the forming of the combined signals 251~253 in the switch control 25 is controlled by the control signal 245, which also determined the components of each combined signals 251~253. Therefore, by the operation of the switch control 25, the reference signals 201 can be resolved into signals of different frequency bandwidths, which are adapted to be analyzed by the signal processor 26.

Wherein, the control signal 245 can be generated either directly by the signal processor 26 or by a power detector 27 for controlling the switch control 25 to generate signals to be analyzed by the signal processor 26. In the condition that the control signal 245 is outputted from the signal processor 26 with respect to a de-spreading signal 281 generated by analyzing the plural combined signals 251~253, in which a means of feedback control is used for controlling the operation of the switch control 25 enabling the frequency bandwidths of the combined signals 251~253 to match with the calculated spectrum of the signal sink of demodulated decoded pulse signal in the signal processor 26. In another condition that the control signal 245 is the level signal 279 generated by the power detector 27 after receiving the filtered signals outputted from the filters of the signal receiver 22, in which a means of feed forward control is used for controlling the operation of the switch control 25 enabling the combined signals 251~253 to have preferred signal-to-noise ratio (SNR) or preferred signal-to-interference-plus-noise ratio (SINR).

In a preferred embodiment of the invention, the power detector 27 is consisted of a power transducer 271, an analog-to-digital converter (A/D converter) 272 and a level meter 273. The power transducer 271 is used for detecting the power of each filtered signal outputted from the corresponding filter 222 and thus outputting a power detection signal 275 accordingly, which is a voltage signal. Thereafter, the A/D converter 272 will convert the power detection signal 275 into a digital signal 277 and transmit the same to the level meter 273. The level meter 273 then will measure the level of the digital signal 277 and compare the level of the digital signal 277 with a reference of the level meter so as to generate a level signal 279. By the use of the level signal 279, the signal strength of each continuous passband of the filters 222 is realized so that the level signal 279 can be used in the means of feed forward control for controlling the operation of the switch control 25 enabling the frequency bandwidth of the bad-pass filter to match with the spectrum of the signal to be analyzed.

In a preferred embodiment of the invention, the signal analyzer 20 further include a switch device 29, which comprises: a first signal analyzing unit 291, for receiving the level signal 279; a second signal analyzing unit 293, for receiving a de-spreading signal 281 generated by the signal processor 26; and a switch 295, for controlling the on/off of the first and the second signal analyzing units 291, 293 so as to correspondingly select an output signal of the switch device using as the control signal 245 from the group consisting of the level signal 279 and the de-spreading signal 281 according to the cluster analysis of the strength histogram relative thereto.

Figure 3:
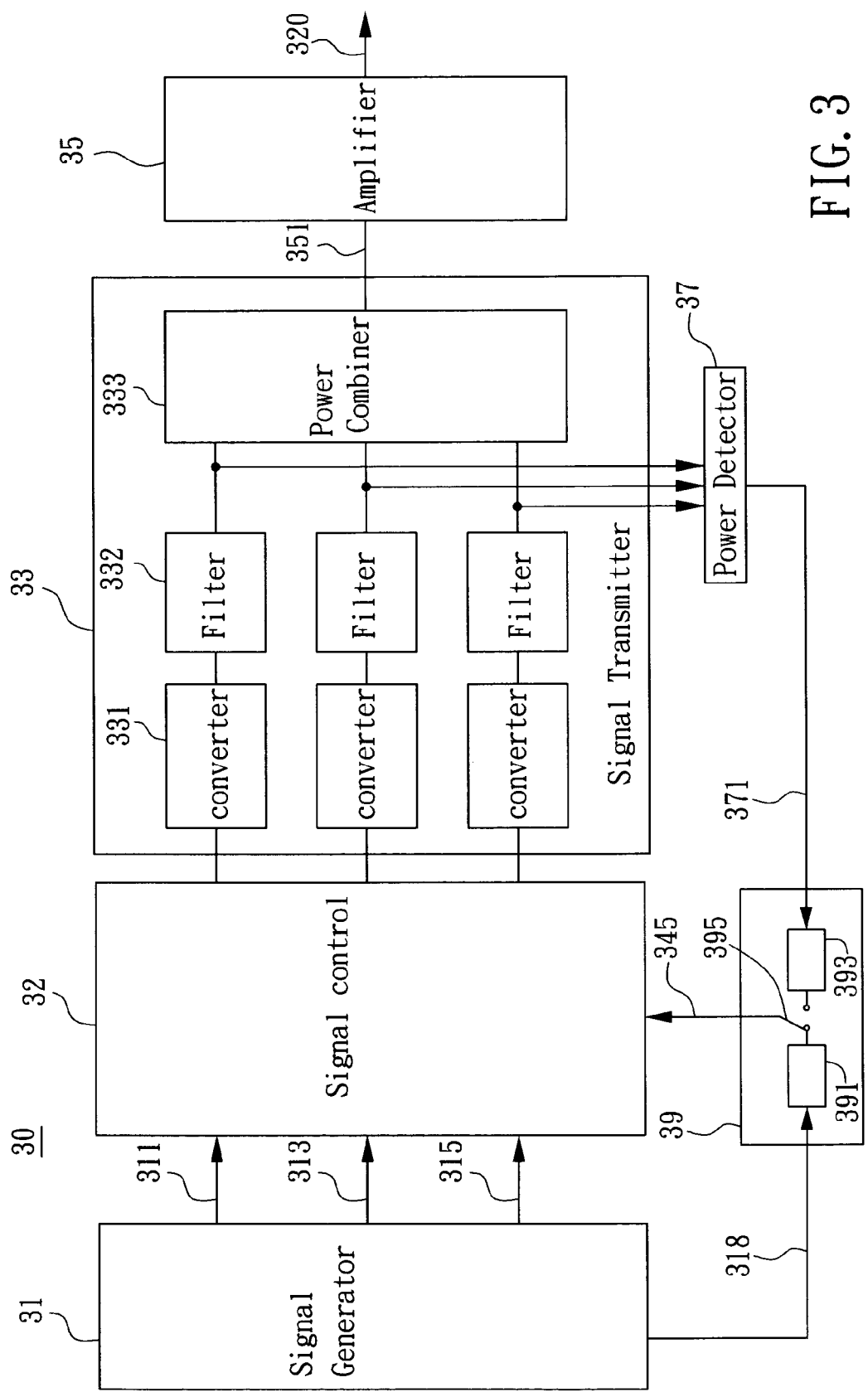
FIG. 3 is a schematic diagram depicting a signal synthesizer of the invention.

Please refer to FIG. 3, which is a schematic diagram depicting a signal synthesizer of the invention. In a preferred embodiment of the invention, the signal synthesizer 30 comprises: a signal generator 31, capable of generating an estimate signal 318, functioned as the de-spreading signal 281 generated by the signal processor 26, and a plurality of pulse signals, represented by the signals 311, 313, 315 shown in FIG. 3; a switch control 32, connected to the signal generator for receiving a plurality of signals outputted from the same, having functions similar to that shown in FIG. 2; a signal transmitter 33, for receiving the signals outputted from the switch control 32 so as to perform operations of filtering, converting and power-combining on the received signals; and an amplifier 35, for receiving and amplifying a signal outputted from the signal transmitter 33 so as to generate a pulse signal 320. By the cooperation of the estimate signal and the switch control 32, a means of feed forward control can be used for controlling the signals 311~315 enabling the frequency bandwidths of the pulse signal 320 to match with the estimated spectrum of the signal generator 31. In addition, the signal synthesizer 30 further comprises a power detector 37, acting similar to that shown in FIG. 2, in which the signal transmitter 33 is detected by the power detector 37 and thus, by the cooperation of the switch control 32, a means of feedback control is used for controlling the signals 311~315 enabling the pulse signal 320 to have preferred characteristics of spur inhibition or harmonics suppression.

Furthermore, the signal transmitter 33 is consisted of a plurality of converters 331, a plurality of filters 332, and a power combiner 333. Preferably, each converter 331 is a modulator capable of up-converting an input signal into a high frequency signal, and the filters 222 are band-pass filters, each with different contiguous passband that is selected with respect to the effective spectrum of each channel. In the signal transmitter 33, a signal outputted from the switch control 32 is first being received and up-converted by a corresponding converter of the plural converters 331 into a high frequency signal, and then the up-converted signal is filtered by a corresponding filter of the plural filters 332. Since different filter has different passband, the plural filtered signals output from the plural filters 332 will have different frequency bandwidth, which are being transmitted to and combined by the power combiner 333 into a combined signal 351 for outputting. In a preferred embodiment of the invention, the power detector 37 is consisted of a power transducer, an analog-to-digital converter (A/D converter) and a level meter, which is similar to that shown in FIG. 2. The power transducer is used for detecting the power of each filtered signal outputted from the corresponding filter 322 and thus outputting a power detection signal 275 accordingly, which is a voltage signal. Thereafter, the A/D converter will convert the power detection signal into a digital signal and transmit the same to the level meter. The level meter then will measure the level of the digital signal and compare the level of the digital signal with a reference of the level meter so as to generate a level signal 371. By transmitting the level signal 371 to a switch device 39, the level signal 371 can be used in the means of feedback control for controlling the operation of the switch control 32 enabling the frequency bandwidth of the band-pass filter to match with the spectrum of the signal to be synthesized.

In this preferred embodiment, the signal analyzer 30 further include a switch device 39, which comprises: a first signal analyzing unit 391, for receiving an estimate signal 318 generated by the signal generator 31; a second signal analyzing unit 393, for receiving the level signal 371; and a switch 395, for controlling the on/off of the first and the second signal analyzing units 391, 393 so as to correspondingly select an output signal of the switch device using as the control signal 345 from the group consisting of the level signal 371 and the estimate signal 318 according to the cluster analysis of the strength histogram relative thereto.

Figure 4:
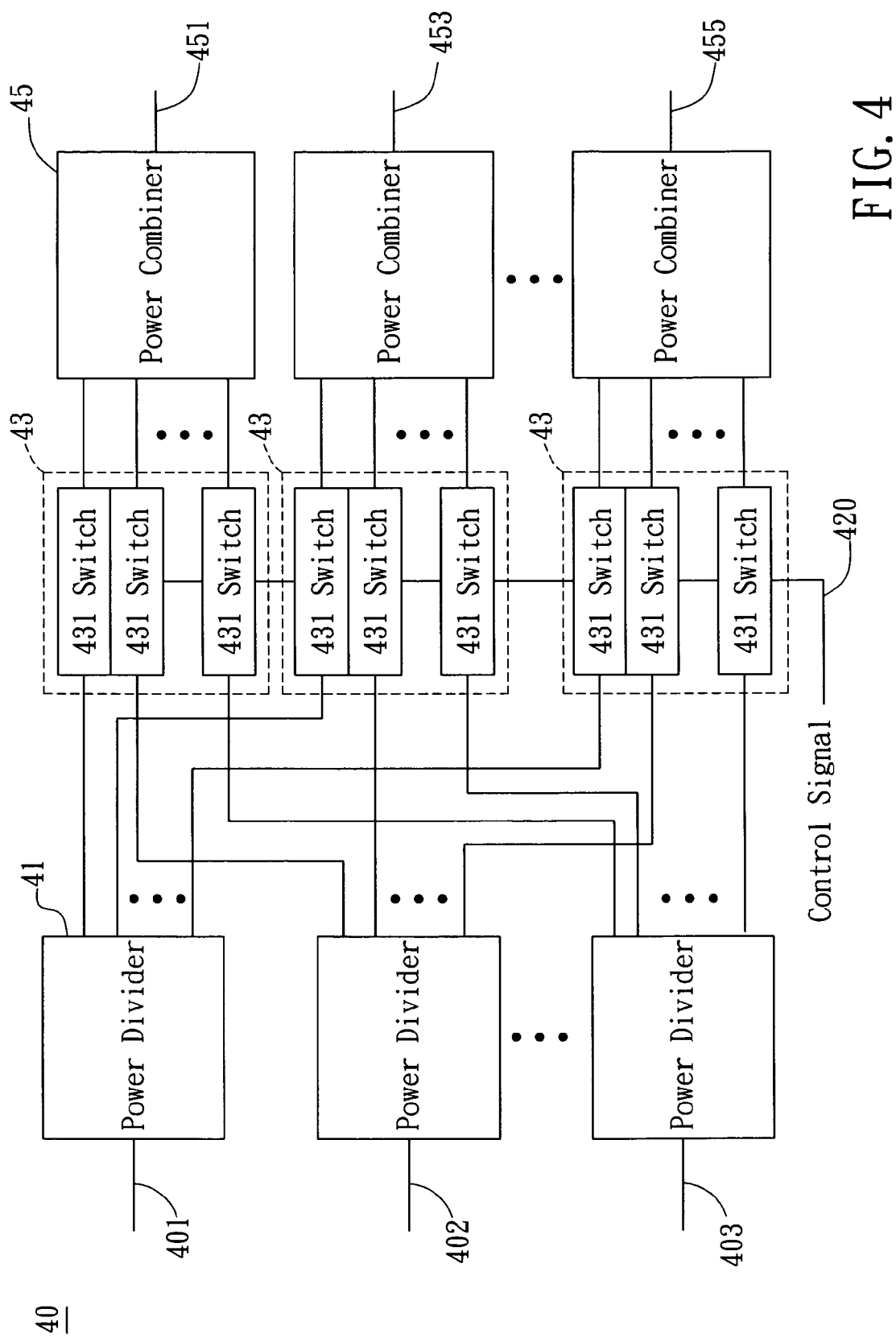
FIG. 4 is a schematic diagram depicting a switch control of the invention.

Please refer to FIG. 4, which is a schematic diagram depicting a switch control used in the signal analyzer of FIG. 2 and the signal synthesizer of FIG. 3. The switch control 40 comprises: a plurality of power dividers 41, each being enabled to received a corresponding input signal, represented by the input signals 401~403 of FIG. 4, for performing an operation of power assignment on the same; a plurality of switch units 43, each being connected to a number of corresponding power dividers 41 out of the plural power dividers 41 for receiving signals outputted from the corresponding power dividers while selectively switching on/off the conducting of the received signals with respect to a control signal 420; and a plurality of power combiners 45, each being connected to a corresponding switch 431 out of the plurality switch units 43 in a one-to-one manner for generating a combined signal by combining the received signals controlled to be conducted, which is represented by the combined signals 451, 453, 455 shown in FIG. 4.

Wherein, the amount of the power dividers 41, the switch units, and the power combiners required in the switch control 40 is designed according to the channel number and the amount of signals to be tested in the wireless network.

In the preferred embodiment shown in FIG. 2 that there are three signals and twenty channels in the wireless network, then there will be twenty power dividers 41 required in the switch control 40 for receiving the specific twenty passbands. For the sake of simplicity, there are three switch units 43 designed in the switch control 40, each having twenty switches 431. Each switch unit 43 is capable of receiving signals outputted from the twenty power dividers 41 while selectively switching on/off the conducting of the received signals with respect to a control signal 245. Thereafter, the three power combiners 45, each being connected to a corresponding switch unit 43 out of the plurality switch units 43 in a one-to-one manner, are capable of generating three combined signals 451, 453, 455 and outputting the same.

In another preferred embodiment shown in FIG. 3 that there are three signals and twenty channels in the wireless network, then there will be twenty power combiners 45 required in the switch control 40 for receiving the specific twenty passbands. For the sake of simplicity, there are twenty switch units 43 designed in the switch control 40, each having three switches 431. Each switch unit 43 is capable of receiving signals outputted from the three power dividers 41 while selectively switching on/off the conducting of the received signals with respect to a control signal 345. Thereafter, the twenty power combiners 45, each being connected to a corresponding switch unit 43 out of the plurality switch units 43 in a one-to-one manner, are capable of generating twenty combined signals 451~455 and outputting the same.

To sum up, the present invention provides a signal testing system, which is capable of achieving a bi-directional wireless transmission measurement enabling mutual testing between device-under-tests and reference devices by configuring a symmetrical structure with circulators and multiplexers. Moreover, the signal testing system not only is capable of fetching signal out of a test path by the use of power dividers and then transmitting the fetched signal to a signal analyzer to be analyzed so as to enable the system to support multiple testing, but also is capable of generating a signal used for referencing by a signal synthesizer so as to enable the system to support numerous tests. In addition, both the signal analyzer and the signal synthesizer have a switch control integrated therein, which enables the signal analyzer to perform analysis on signals of different frequency bandwidth, and enables the signal synthesizer to generate signals of different frequency bandwidth as require.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A signal testing system, adapted for testing at least a device-under-test while selectively connecting the system to a reference device externally, the signal testing system comprising:

a first circulator, being connected to the reference device for receiving a reference signal transmitting therefrom;

a second circulator, being connected to the device-under-test for receiving a testing signal transmitting therefrom;

a first channel emulator, receiving a signal transmitted from the first circulator for simulating a first wireless transmission environment;

a first power divider, receiving a signal transmitted from the first channel emulator for performing an operation of power assignment thereon while transmitting the divided signal to the second circulator;

a second channel emulator, receiving a signal transmitted from the second circulator for simulating a second wireless transmission environment;

a second power divider, receiving a signal transmitted from the second channel emulator for performing an operation of power assignment thereon while transmitting the divided signal to the first circulator;

a first duplexer, for receiving signals transmitted from the first power divider and the second power divider in respective; and a signal analyzer, receiving and analyzing signals transmitted from the first duplexer;

wherein, the first circulator generates a signal to be received by the reference device while receiving the divided signal transmitted from the second power divider; and the second circulator generates a signal to be received by the device-under-test while receiving the divided signal transmitted from the first power divider.

2. The signal testing system of claim 1, wherein the signal testing system is connected externally to a plurality of reference devices while the system further comprises:

a first multiplexer, selectively receiving signals transmitted from the plural reference devices while combining the received signals to generated a signal to be received by the first circulator; and a second multiplexer, selectively receiving signals transmitted from the plural device-under-tests while combining the received signals to generated a signal to be received by the second circulator;

wherein the first multiplexer separate a signal transmitted from the first circulator so as to generates signals to be received by the plural reference devices; and the second multiplexer separate a signal transmitted from the second circulator so as to generates signals to be received by the plural device-under-tests.

3. The signal testing system of claim 1, wherein the signal analyzer further comprises:

an amplifier, connected to the first duplexer for amplifying the signals transmitted therefrom;

a signal receiver, connected to the amplifier, capable of power-dividing, filtering and converting the signals outputted from the amplifier;

a switch control, connected to the signal receiver for, capable of power-dividing the signals transmitted from the signal receiver while selectively switching on/off the conducting of the divided signals so as to generate a plurality of combined signals, each being formed by selectively combining at least a divided signal selected from the group of the conducting signals; and a signal processor, for receiving and analyzing the plural combined signals.

4. The signal testing system of claim 3, wherein the signal receiver further comprises:

a power divider, connected to the amplifier, for performing an operation of power assignment to the signal outputted from the amplifier;

a plurality of filters, each being connected to a corresponding signal transmitted from the power divider in a one-to-one manner for filtering the same to generated a corresponding filtered signal; and a plurality of converters, each being connected to a corresponding filter out of the plural filters in a one-to-one manner for converting the corresponding filtered signal into an output signal of the signal receiver.

5. The signal testing system of claim 4, wherein the plural filters are band-pass filters.

6. The signal testing system of claim 3, wherein the amplifier is a low-noise amplifier.

7. The signal testing system of claim 3, wherein the output signal of the signal receiver is an intermediate frequency (IF) signal.

8. The signal testing system of claim 3, wherein the switch control further comprises:

a plurality of power dividers, each being enabled to received a corresponding signal outputted from the signal receiver in a one-to-one manner for performing an operation of power assignment on the same;

a plurality of switch units, each being connected to a number of corresponding power dividers out of the plural power dividers for receiving signals outputted from the corresponding power dividers while selectively switching on/off the conducting of the received signals with respect to a control signal; and a plurality of power combiners, each being connected to a corresponding switch unit out of the plurality switch units in a one-to-one manner for generating a combined signal by combining the received signals controlled to be conducted.

9. The signal testing system of claim 8, wherein each switch unit comprises a plurality of switches, each being connected to a corresponding power divider out of the plural power dividers in a one-to-one manner, for receiving a corresponding signal outputted from the corresponding power divider while selectively switching on/off the conducting of the received signal.

10. The signal testing system of claim 8, wherein the signal analyzer further comprises a power detector, comprising:

a power transducer, connected to receive and detect a plurality of filtered signals outputted from filters of the signal receiver for generating a power detection signal accordingly;

an analog-to-digital converter, for receiving and converting the power detection signal into a digital signal; and a level meter, for receiving the digital signal while comparing the digital signal with a reference of the level meter so as to generate a level signal to be employed as the control signal.

11. The signal testing system of claim 10, wherein the power detection signal is a voltage signal.

12. The signal testing system of claim 10, wherein the signal analyzer includes a switch device, further comprising:
- a first signal analyzing unit, for receiving the level signal;
- a second signal analyzing unit, for receiving a de-spreading signal generated by the signal processor; and
- a switch, for controlling the on/off of the first and the second signal analyzing units so as to correspondingly select an output signal of the switch device from the group consisting of the level signal and the de-spreading signal while employing the selected output signal as the control signal.

13. The signal testing system of claim 8, wherein the signal processor is capable of analyzing the plural combined signals for generating a de-spreading signal to be employed as the control signal.

14. The signal testing system of claim 1, wherein the first channel emulator and the second channel emulator respectively comprises a transmission line, an attenuator, a delay line, an equalizer, a filter, a limiter and a channel simulator.

15. The signal testing system of claim 1, further comprising:
- a signal synthesizer, for generating a pulse signal; and
- a second duplexer, connected to the signal synthesizer, for enabling a situation selected from one of the following: transmitting the pulse signal to the first multiplexer for using the same as the signal outputted from the reference device, and transmitting the pulse signal to the second multiplexer for using the same as the signal outputted from the device-under-test.

16. The signal testing system of claim 15, wherein the signal synthesizer further comprises:
- a signal generator;
- a switch control, connected to the signal generator for receiving a plurality of signals outputted from the same, capable of power-dividing the plural signals transmitted from the signal generator while selectively switching on/off the conducting of the divided signals so as to generate a plurality of combined signals, each being formed by selectively combining at least a divided signal selected from the group of the conducting signals;
- a signal transmitter, for receiving the signals outputted from the switch control so as to perform operations of filtering, converting and power-combining on the received signals; and
- an amplifier, for receiving and amplifying a signal outputted from the signal transmitter so as to generate the pulse signal.

17. The signal testing system of claim 16, wherein the switch control further comprises:
- a power transducer, connected to receive and detect a plurality of filtered signals outputted from filters of the signal receiver for generating a power detection signal accordingly;
- a plurality of switch units, each being connected to a number of corresponding power dividers out of the plural power dividers for receiving signals outputted from the corresponding power dividers while selectively switching on/off the conducting of the received signals with respect to a control signal; and
- a plurality of power combiners, each being connected to a corresponding switch unit out of the plurality switch units in a one-to-one manner for generating a combined signal by combining the received signals controlled to be conducted.

18. The signal testing system of claim 17, wherein each switch unit comprises a plurality of switches, each being connected to a corresponding power divider out of the plural power dividers in a one-to-one manner, for receiving a corresponding signal outputted from the corresponding power divider while selectively switching on/off the conducting of the received signal.

19. The signal testing system of claim 17, wherein the signal synthesizer further comprises a power detector, comprising:
- a power transducer, connected to receive and detect a plurality of filtered signals outputted from filters of the signal receiver for generating a power detection signal accordingly;
- an analog-to-digital converter, for receiving and converting the power detection signal into a digital signal; and
- a level meter, for receiving the digital signal while comparing the digital signal with a reference of the level meter so as to generate a level signal to be employed as the control signal.

20. The signal testing system of claim 17, wherein the signal generator generates an estimate signal to be employed as the control signal.

21. The signal testing system of claim 19, wherein the power detection signal is a voltage signal.

22. The signal testing system of claim 19, wherein the signal generator comprises a switch device, further comprising:
- a first signal analyzing unit, for receiving the level signal;
- a second signal analyzing unit, for receiving the estimate signal 1 generated by the signal generator; and
- a switch, for controlling the on/off of the first and the second signal analyzing units so as to correspondingly select an output signal of the switch device from the group consisting of the level signal and the estimate signal while employing the selected output signal as the control signal.

23. The signal testing system of claim 16, wherein the signal transmitter further comprises:
- a plurality of converters, each being connected to a corresponding signal outputted from the switch control in a one-to-one manner for converting the corresponding received signal;
- a plurality of filters, each being connected to a corresponding converted signal transmitted from the corresponding converter in a one-to-one manner for filtering the same to generated a corresponding filtered signal; and
- a power combiner, connected to the plural filters, for combining the power of the plural filtered signals to form an output signal of the signal transmitter.

24. The signal testing system of claim 23, wherein the converted signal outputted from the signal transmitter is a high frequency signal.

25. The signal testing system of claim 23, wherein the plural filters are band-pass filters.

* * * * *